United States Patent
Wang et al.

(10) Patent No.: US 11,388,666 B2
(45) Date of Patent: Jul. 12, 2022

(54) METHOD AND SYSTEM FOR USER EQUIPMENT POWER SAVING

(71) Applicant: Verizon Patent and Licensing Inc., Washington, DC (US)

(72) Inventors: Xin Wang, Morris Plains, NJ (US); Nanjun Qian, Princeton, NJ (US); Lily Zhu, Parsippany, NJ (US); Jeremy Nacer, Boca Raton, FL (US); Nischal Patel, Gilberts, IL (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 153 days.

(21) Appl. No.: 16/804,375

(22) Filed: Feb. 28, 2020

(65) Prior Publication Data
US 2021/0274441 A1    Sep. 2, 2021

(51) Int. Cl.
*H04W 52/02* (2009.01)
*H04W 72/14* (2009.01)
*H04W 72/04* (2009.01)

(52) U.S. Cl.
CPC ..... *H04W 52/0225* (2013.01); *H04W 72/042* (2013.01); *H04W 72/14* (2013.01)

(58) Field of Classification Search
CPC ............. H04W 52/0225; H04W 72/14; H04W 72/042; H04W 76/28; H04W 74/006; H04W 52/0229; H04W 72/1289; H04L 5/0055
See application file for complete search history.

(56) References Cited

U.S. PATENT DOCUMENTS

| | | | | |
|---|---|---|---|---|
| 2010/0150091 | A1* | 6/2010 | Yu | H04W 72/042 370/329 |
| 2014/0056198 | A1* | 2/2014 | Quan | H04W 52/0216 370/311 |
| 2014/0064134 | A1* | 3/2014 | Huang | H04W 76/38 370/253 |
| 2016/0261382 | A1* | 9/2016 | Vajapeyam | H04L 1/1893 |
| 2017/0156157 | A1* | 6/2017 | Zhang | H04W 72/1278 |
| 2020/0322980 | A1* | 10/2020 | Fakoorian | H04L 1/1819 |
| 2021/0127369 | A1* | 4/2021 | Ma | H04W 72/14 |

OTHER PUBLICATIONS

Tseng et al. "Delay and Power Consumption in LTE/LTE-A DRX Mechanism With Mixed Short and Long Cycles", 2015, IEEE, pp. 1721-1734 (Year: 2015).*

* cited by examiner

*Primary Examiner* — Michael K Phillips

(57) ABSTRACT

A method, a device, and a non-transitory storage medium provide a false grant detection service. An end device may receive downlink control information when in a discontinuous reception active state. The downlink control information may include a new downlink transmission grant or a new uplink transmission grant. When downlink data pertaining to the new downlink transmission grant is unsuccessfully decoded, the end device may identify the new downlink transmission grant as a potential false grant and invoke a verification procedure. Depending on the result of the verification procedure, the end device may or may not start a discontinuous reception inactivity timer depending on whether the potential false grant is deemed a false grant or a valid grant. Similarly, the end device may invoke a verification procedure for a new uplink transmission grant. The detection of false grants may minimize the waste of power for the end device.

20 Claims, 13 Drawing Sheets

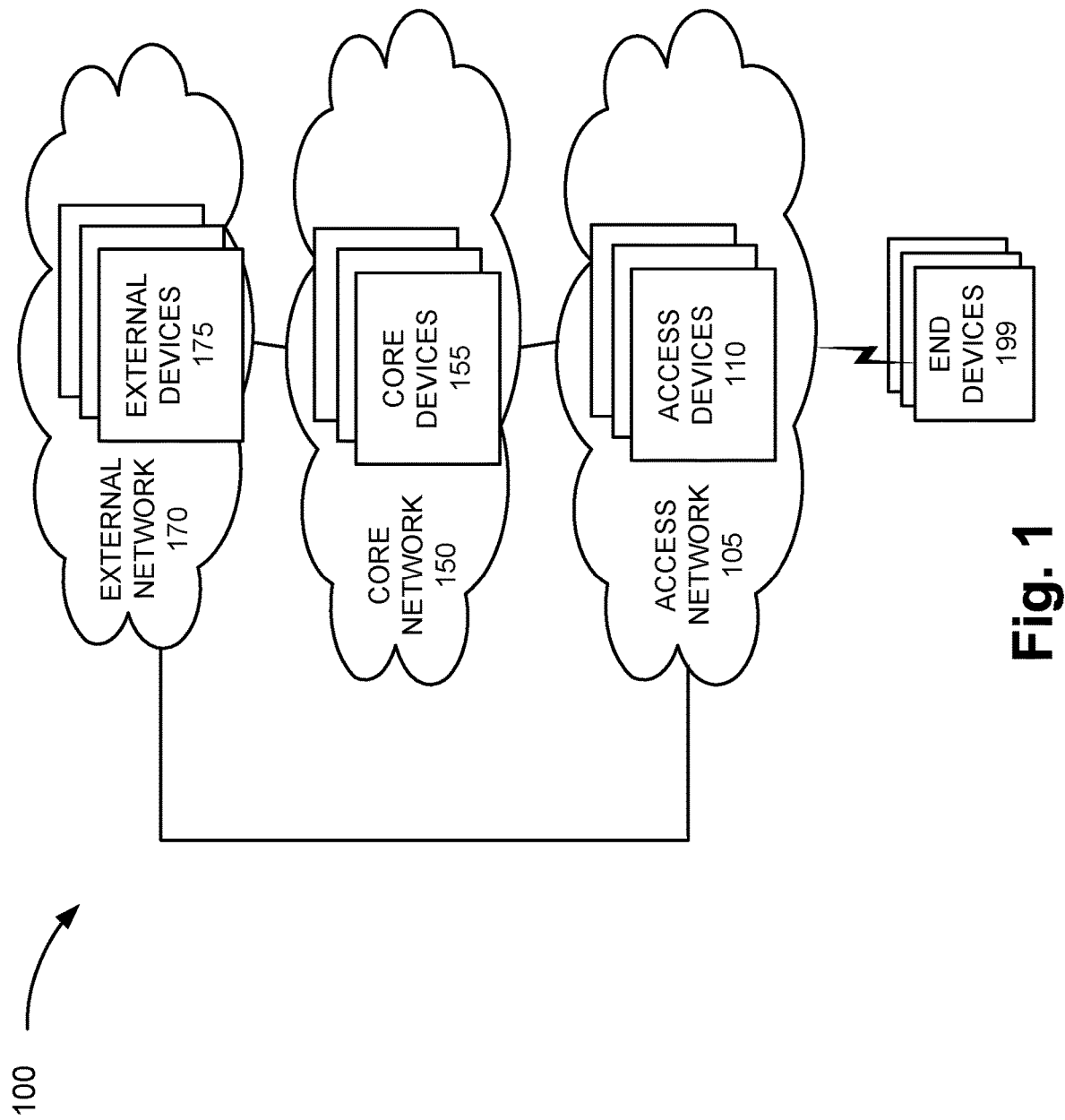

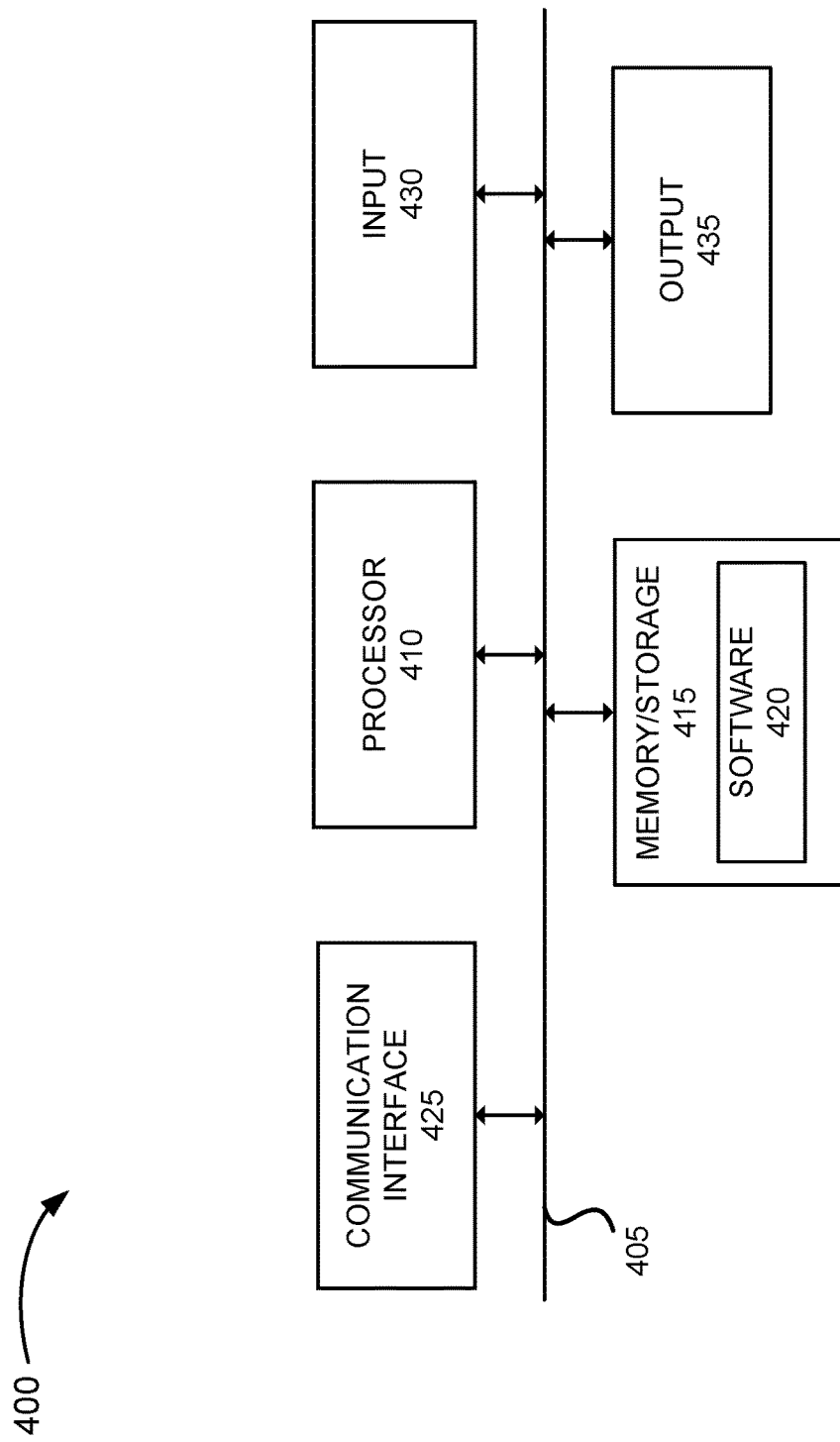

METHOD AND SYSTEM FOR USER EQUIPMENT POWER SAVING

BACKGROUND

Discontinuous reception (DRX) is a process of turning on and turning off a radio receiver according to a schedule that is coordinated between a wireless network and a wireless end device. In this way, the wireless device does not need to continuously monitor control channels for messages, and can reduce power consumption and extend battery life.

BRIEF DESCRIPTION OF THE DRAWINGS

FIG. 1 is a diagram illustrating an exemplary environment in which an exemplary embodiment of a false grant detection service may be implemented;

FIG. 4 is a diagram illustrating exemplary components of a device that may correspond to one or more of the devices illustrated herein;

DETAILED DESCRIPTION OF PREFERRED EMBODIMENTS

Figure 2A:
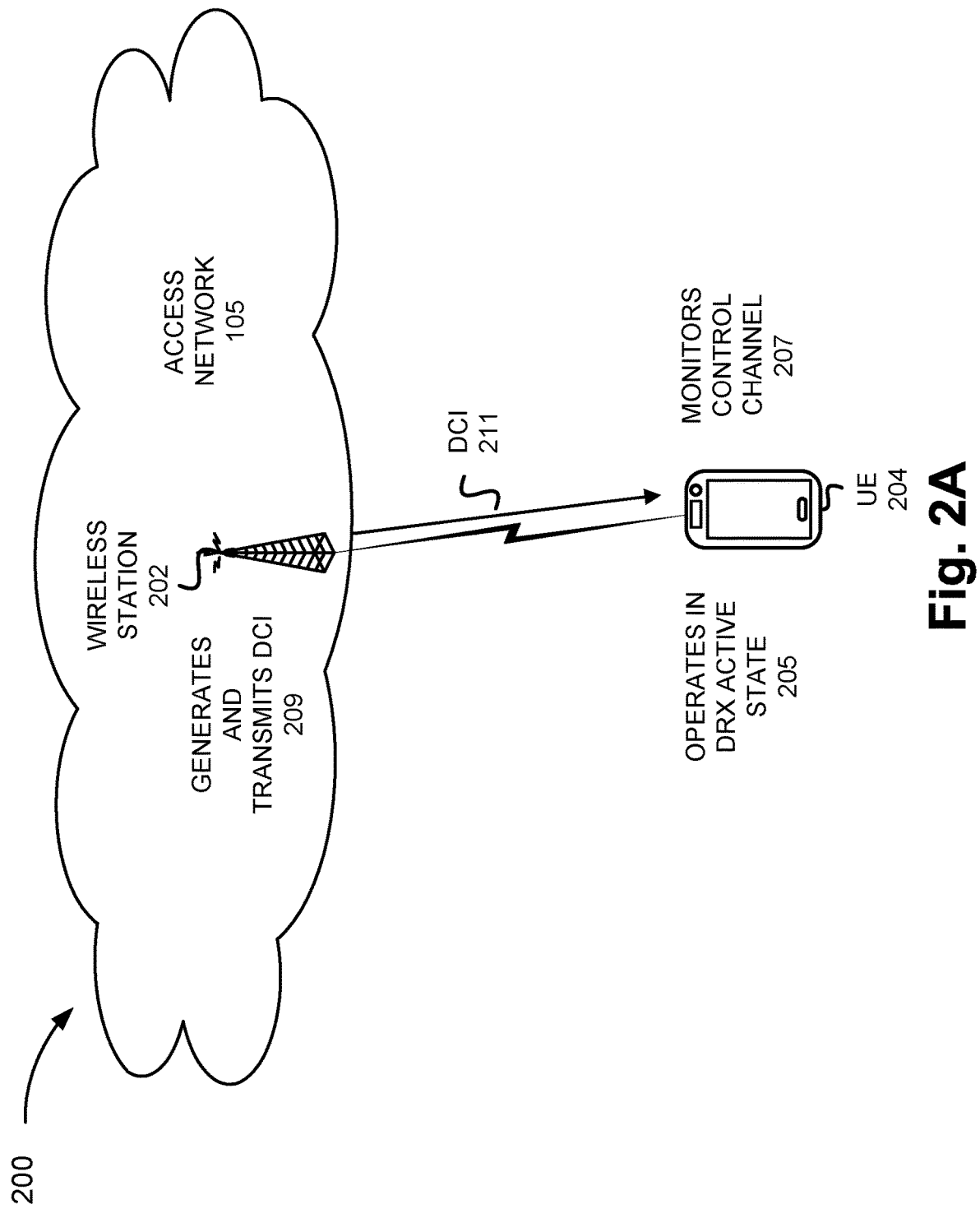
FIGS. 2A-2G are diagrams illustrating exemplary processes of the false grant detection service implemented in another exemplary environment.

The following detailed description refers to the accompanying drawings. The same reference numbers in different drawings may identify the same or similar elements. Also, the following detailed description does not limit the invention.

A wireless end device (e.g., an Internet of Things (IoT) device, etc.) or user equipment (UE) may use DRX to turn a radio receiver on and off according to a schedule that is coordinated between the wireless end device and a wireless network. For Fifth Generation (5G) wireless networks, UE power consumption and overheating may be a significant issue due to the larger bandwidth (e.g., centimeter-wave (cm-Wave) or millimeter-wave (mm-Wave)), beam management, and lower power amplifier (PA) efficiency. Indeed, the power-added efficiency (PAE) of a radio-frequency PA (RF PA) may dictate the power and heat dissipation for a transmitter of the UE. A 5G-capable UE may shut down 5G new radio (NR) when the device surface temperature is over certain safety limits, which may lead to poor 5G user experience.

The UE may monitor a NR Physical Downlink Control Channel (PDCCH) when in a DRX active state for downlink (DL) and uplink (UL) grants. The UE may perform blind decoding in UE-specific and common search spaces, and may perform hypothesis testing with various downlink control information (DCI) formats (e.g., Format 0_0, 0_1, 1_0, 1_1, 2_0, 2_1, 2_2, 2_3, etc.). The downlink control information may include information that provides scheduling for a downlink data channel (e.g., Physical Data Shared Channel (PDSCH)) or an uplink data channel (e.g., Physical Uplink Shared Channel (PUSCH)). There is a possibility, however, that the UE may falsely detect a downlink grant or an uplink grant (e.g., a false alarm). While in DRX operation, the falsely detected downlink grant or uplink grant may cause the UE to re-start a DRX Inactivity timer, and delay the UE from going to sleep. As a consequence, the UE will consume more power and potentially experience thermal issues.

According to exemplary embodiments, a false grant detection service is described. According to an exemplary embodiment, the false grant detection service applies to an end device when the end device may be in a connected DRX mode (e.g., versus in idle mode). According to exemplary embodiment, the false grant detection service detects a false downlink grant. According to an exemplary embodiment, the false grant detection service may be invoked when a new transmission downlink grant is triggered. For example, when downlink data is not successfully decoded, the false grant detection service may perform a downlink grant verification procedure, as described herein. Depending on the outcome of the downlink grant verification procedure, the downlink grant may be considered verified or false.

According to an exemplary embodiment, the false grant detection service detects a false uplink grant. According to an exemplary embodiment, the false grant detection service may be invoked when a new transmission uplink grant is triggered. Depending on the outcome of the uplink grant verification procedure, the uplink grant may be considered verified or false. According to exemplary embodiments, the false grant detection service may be implemented on various types of end devices.

As a result of the foregoing, the false grant detection service may improve the identification of false grants, which in turn may improve battery life for the end device, and may minimize the potential for overheating.

FIG. 1 is a diagram illustrating an exemplary environment 100 in which an exemplary embodiment of the false grant detection service may be implemented. As illustrated, environment 100 includes an access network 105, a core network 150, and an external network 170. Access network 105 includes access devices 110, core network 150 includes core devices 155, and external network 170 includes external devices 175. Environment 100 further includes end devices 199.

The number, type, and arrangement of networks illustrated in environment 100 are exemplary. Additionally, or alternatively, other networks not illustrated in FIG. 1 may be included in environment 100, such as a backhaul network, a fronthaul network, or another type of intermediary network, as described herein.

The number, the type, and the arrangement of network devices in access network 105, core network 150, external network 170, as illustrated and described, are exemplary. The number of end devices 199 is exemplary. A network device, a network element, or a network function (referred to herein simply as a network device) may be implemented according to one or multiple network architectures (e.g., a client device, a server device, a peer device, a proxy device, a cloud device, a virtualized function, and/or another type of network architecture (e.g., Software Defined Networking (SDN), virtual, logical, network slicing, etc.)). Additionally, a network device may be implemented according to various computing architectures, such as centralized, distributed, cloud (e.g., elastic, public, private, etc.), edge, fog, and/or another type of computing architecture.

Environment 100 includes communication links between the networks, between network devices, and between end device 199 and network devices. Environment 100 may be implemented to include wired, optical, and/or wireless communication links among the network devices and the networks illustrated. A communicative connection via a communication link may be direct or indirect. For example, an indirect communicative connection may involve an intermediary device and/or an intermediary network not illustrated in FIG. 1. A direct communicative connection may not involve an intermediary device and/or an intermediary network. The number and the arrangement of communication links illustrated in environment 100 are exemplary.

Environment 100 may include various planes of communication including, for example, a control plane, a user plane, a service plane, and/or a network management plane. Environment 100 may include other types of planes of communication. A message communicated in support of the false grant detection service may use at least one of these planes of communication. According to various exemplary implementations, the interface of a network device and/or an end device may be a service-based interface, a reference point-based interface, an Open Radio Access Network (O-RAN) interface, or some other type of interface.

Access network 105 may include one or multiple networks of one or multiple types and technologies. For example, access network 105 may be implemented to include a Fourth Generation (4G) RAN (e.g., an Evolved UMTS Terrestrial Radio Access Network (E-UTRAN) of a Long Term Evolution (LTE) network), a 4.5G RAN (e.g., an E-UTRAN of an LTE-Advanced (LTE-A) network), an RAN of an LTE-A Pro network, a next generation RAN (e.g., a Fifth Generation (5G)-access network (5G-AN) or a 5G-RAN (referred to herein as simply a 5G-RAN)), another type of future generation RAN, and/or another type of RAN (e.g., a legacy Third Generation (3G) RAN, etc.). Access network 105 may further include other types of wireless networks, such as a Wi-Fi network, a Worldwide Interoperability for Microwave Access (WiMAX) network, a local area network (LAN), a Bluetooth network, a personal area network (PAN), a Citizens Broadband Radio System (CBRS) network, or another type of wireless network (e.g., a legacy Third Generation (3G) RAN, etc.). Access network 105 may include a wired network, an optical network, or another type of network that may provide communication with core network 150, for example.

According to various exemplary embodiments, access network 105 may be implemented to include various architectures of wireless service, such as, for example, macrocell, microcell, femtocell, picocell, metrocell, NR cell, LTE cell, non-cell, or another type of architecture. Additionally, according to various exemplary embodiments, access network 105 may be implemented according to various wireless technologies (e.g., radio access technologies (RATs), etc.), wireless standards, wireless frequencies/bands/carriers (e.g., cm-Wave, mm-Wave, below 6 Gigahertz (GHz), above 6 GHz, licensed radio spectrum, unlicensed radio spectrum, etc.), and/or other attributes of the radio.

Depending on the implementation, access network 105 may include one or multiple types of network devices, such as access devices 110. For example, access devices 110 may include an evolved Node B (eNB), a next generation Node B (gNB), an evolved Long Term Evolution (eLTE) eNB, a radio network controller (RNC), a remote radio head (RRH), a baseband unit (BBU), a centralized unit (CU), a distributed unit (DU), a small cell node (e.g., a picocell device, a femtocell device, a microcell device, a home eNB, etc.), a future generation wireless access device, another type of wireless node (e.g., a WiMax device, a hotspot device, etc.) that provides a wireless access service.

Core network 150 may include one or multiple networks of one or multiple types and technologies. According to an exemplary embodiment, core network 150 includes a complementary network of access network 105. For example, core network 150 may be implemented to include an Evolved Packet Core (EPC) of an LTE network, an LTE-A network, an LTE-A Pro network, a next generation core (NGC) network, and/or a future generation network. Core network 150 may include a legacy core network.

Depending on the implementation, core network 150 may include various types of network devices, such as core devices 155. For example, core devices 155 may include a mobility management entity (MME), a packet gateway (PGW), an ePDG, a serving gateway (SGW), a home agent (HA), a GPRS support node (GGSN), a home subscriber server (HSS), an authentication, authorization, and accounting (AAA) server, a policy charging and rules function (PCRF), a charging system (CS), a user plane function (UPF), a Non-3GPP Interworking Function (N3IWF), an access and mobility management function (AMF), a session management function (SMF), a unified data management (UDM) device, an authentication server function (AUSF), a network slice selection function (NSSF), a network repository function (NRF), a policy control function (PCF), a network data analytics function (NWDAF), a network exposure function (NEF), a lifecycle management (LCM) device, and/or an application function (AF). According to other exemplary implementations, core devices 155 may include additional, different, and/or fewer network devices than those described. For example, core devices 155 may include a non-standard and/or a proprietary network device, or another type of network device that may be well-known but not particularly mentioned herein. Access network 105 and/or core network 150 may include a public network, a private network, and/or an ad hoc network.

External network 170 may include one or multiple networks. For example, external network 170 may be implemented to include a service or an application-layer network, the Internet, the World Wide Web (WWW), an Internet Protocol Multimedia Subsystem (IMS) network, a Rich Communication Service (RCS) network, a cloud network, a packet-switched network, a private network, a public network, a multi-access edge computing (MEC) network (also known as a mobile edge computing), a fog network, or other type of network that hosts an end device application or service.

Depending on the implementation, external network 170 may include various network devices, such as external devices 175. For example, external devices 175 may provide various applications, services, or other type of end device assets, such as servers (e.g., web, application, cloud, etc.), mass storage devices, and/or data center devices. According to various exemplary implementations, the application services may pertain to broadband services in dense areas (e.g., pervasive video, smart office, operator cloud services, video/photo sharing, etc.), broadband access everywhere (e.g., 50/100 Mbps, ultra low-cost network, etc.), higher user mobility (e.g., high speed train, remote computing, moving hot spots, etc.), Internet of Things (IoTs) (e.g., smart wearables, sensors, mobile video surveillance, smart cities, connected home, etc.), extreme real-time communications (e.g., tactile Internet, augmented reality, etc.), lifeline communications (e.g., natural disaster, emergency response, etc.), ultra-reliable communications (e.g., automated traffic control and driving, collaborative robots, health-related services (e.g., monitoring, remote surgery, etc.), drone delivery, public safety, etc.), broadcast-like services, real-time communications (e.g., voice, video conferencing, etc.), and/or messaging (e.g., texting, etc.). External devices 175 may also include network devices that provide other network-related functions, such as network management, load balancing, security, authentication and authorization, policy control, billing, and routing. External network 170 may include a private network and/or a public network.

End device 199 includes a device that has computational and wireless communicative capabilities. Depending on the implementation, end device 199 may be a mobile device, a portable device, a stationary device, a device operated by a user (e.g., user equipment (UE)), or a device not operated by a user. For example, end device 199 may be implemented as a smartphone, a mobile phone, a personal digital assistant, a tablet, a netbook, a phablet, a wearable device (e.g., a watch, glasses, etc.), a computer, a device in a vehicle, an IoT device, or other type of wireless device. End device 199 may be configured to execute various types of software (e.g., applications, programs, etc.). The number and the types of software may vary among end devices 199. According to an exemplary embodiment, end device 199 provides the false grant detection service, as described herein.

A MAC entity of end device 199 may handle various transport channels. For example, the MAC entity may handle a Broadcast Channel (BCH), a Downlink Shared Channel (DL-SCH), a Paging Channel (PCH), an Uplink Shared Channel (UL-SCH), and a Random Access Channel (RACH). According to some exemplary implementations, the Radio Resource Control (RRC) layer may control the MAC configuration.

The RRC layer may also configure the MAC entity with DRX functionality that may control monitoring for activity for various identifiers of end device 199 and/or the MAC entity such as a Cell Radio Network Temporary Identifier (C-RNTI), a Configured Schedule RNTI (CS-RNTI), an Interruption RNTI (INT-RNTI), a Slot Format Indication RNTI (SFI-RNTI), a Semi-Persistent Channel State Information RNTI (SP-CSI-RNTI), a Transport Power Control-Physical Uplink Control Channel RNTI (TPC-PUCCH-RNTI), a Transport Power Control-Physical Uplink Shared Channel RNTI (TPC-PUSCH-RNTI), a Transport Power Control-Sounding Reference Symbols RNTI (TPC-SRS-RTNI), and another configurable identifier.

The RRC layer may control DRX operation based on various parameters. For the sake of description, the nomenclature used for these parameters may align with a standard's body (e.g., Third Generation Partnership Project (3GPP), International Telecommunication Union (ITU), European Telecommunications Standards Institute (ETSI), GSM Association (GSMA), etc.). For example, the parameters may include a drx-Inactivity Timer, a drx-HARQ-RTT-Timer DL, and a drx-retransmissionTimerDL. The drx-Inactivity Timer may indicate a time duration after a new uplink or a new downlink transmission grant for the MAC entity is received on a control channel (e.g., PDCCH). The drx-HARQ-RTT-TimerDL may indicate a minimum time duration before a downlink assignment for Hybrid Automatic Repeat Request (HARQ) retransmission may be expected by the MAC entity. The drx-retransmissionTimerDL may indicate a maximum time duration until a downlink retransmission may be received.

According to an exemplary embodiment, the DRX Inactivity timer may be triggered when a new downlink transmission grant is received as compared to a downlink retransmission grant. For a new downlink transmission grant, the downlink control information may be received by end device 199 and used to receive, via a data channel (e.g., PDSCH, etc.) and decode the downlink (traffic) data. The false grant detection service of end device 199 may determine that whether the downlink grant is a cleared grant. For example, when the downlink (traffic) data is successfully decoded, the false grant detection service may determine that the downlink grant is cleared. However, for a new downlink transmission grant, when the downlink (traffic) data is not successfully decoded by end device 199, the false grant detection service of end device 199 may consider the new downlink grant a potential false grant. For example, end device 199 may determine that an error occurred based on a cyclic redundancy check (CRC) procedure applied to the downlink (traffic) data. In response, the false grant detection service may invoke a verification procedure that verifies the new downlink transmission grant.

According to an exemplary embodiment, the verification procedure may include end device 199 to invoke a HARQ procedure. End device 199 may transmit a HARQ message (e.g., a Negative Acknowledgement (NACK)) to access device 110 via a control channel or a data channel.

The false grant detection service of end device 199 may start one or multiple timers. For example, end device 199 may start a DRX HARQ RTT timer (e.g., according to drx-HARQ-RTT-TimerDL). Additionally, or alternatively, end device 199 may start a DRX Retransmission timer (e.g., according to drx-retransmissionTimerDL).

When end device 199 receives a retransmission grant by the expiration of the timer, the false grant detection service of end device 199 may determine that the new downlink transmission grant has been verified. However, when end device 199 does not receive a retransmission grant by the expiration of the timer, the false grant detection service of end device 199 may determine that the new downlink transmission grant has not been verified (e.g., a false grant has been detected).

For a new uplink transmission grant (as compared to an uplink retransmission grant), when the downlink control information is received by end device 199, the false grant detection service of end device 199 may determine whether the uplink transmission grant is false or not. For example, the false grant detection service may invoke a verification procedure that verifies the new uplink transmission grant. According to an exemplary embodiment, the verification procedure may include end device 199 checking if there is data available in a buffer or another type of memory or storage device that may store data for uplink transmission. When there is no data available in the buffer for uplink transmission, the false grant detection service of end device 199 may determine that the new uplink transmission grant has not been verified (e.g., a false grant has been detected). However, when there is data available in the buffer for uplink transmission, the false grant detection service of end device 199 may consider the new uplink transmission grant has been verified.

According to an exemplary embodiment, when a new uplink or downlink transmission grant has been verified, end device 199 may start or restart a DRX Inactivity timer. For example, end device 199 may exit a grant verification state for the grant in question. End device 199 may start the DRX Inactivity timer with a value set to T in which T may be calculated according to the exemplary expression:

$$T = \text{DRX Inactivity Timer} - \text{Time Elapsed for Grant Verification} \quad (1)$$

Alternatively, end device 199 may restart the DRX Inactivity timer with a value set to T when the DRX Inactivity Timer is running but the remaining time value is less than T Depending on when end device 199 receives the new transmission grant, there may be multiple grant verifications running in parallel. End device 199 may treat each new transmission grant on an individual basis. Conversely, when the new uplink or downlink transmission grant has been determined as a false grant, end device 199 may not start or restart the DRX Inactivity timer.

According to an exemplary embodiment, when a new transmission grant is pending verification, end device 199 may not start or restart the DRX Inactivity timer. End device 199 may be considered in an active time state during the verification procedure. Additionally, the duration of the DRX Inactivity timer may be significantly longer than the duration of the verification procedure.

FIGS. 2A-2G are diagrams of exemplary processes of the false grant detection service in an exemplary environment 200. As illustrated, referring to FIG. 2A, access network 105 includes a wireless station 202 (e.g., access device 110). End device 199 may be implemented as a UE 204. According to an exemplary scenario, assume UE 204 operates in a DRX active state 205 and monitors a control channel 207, such as a PDCCH. During this time, wireless station 202 may generate and transmit DCI 209, which is further illustrated as DCI 211.

Figure 2B:
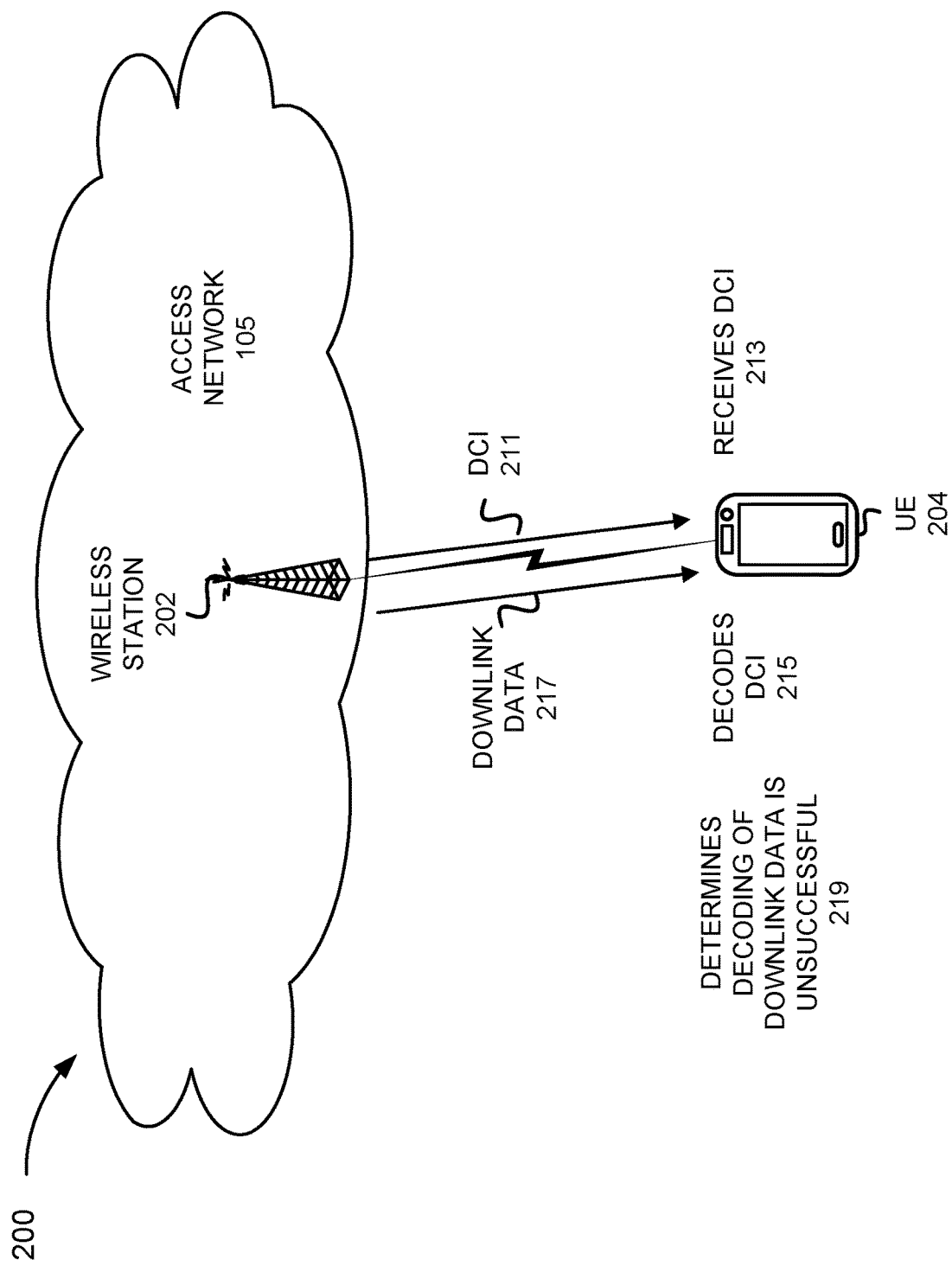

Referring to FIG. 2B, UE 204 may receive DCI 213, decodes the DCI 215 and may detect a new downlink transmission grant. Based on the new downlink transmission grant, UE 204 may receive downlink data 217 from wireless station 202 via a data channel. UE 204 may determine that the decoding of the downlink data is unsuccessful 219. For example, UE 204 may determine that a CRC procedure did not yield a positive result. According to other exemplary scenarios, although not illustrated, UE 204 may determine that the decoding is successful, and in response start a DRX Inactivity timer.

Figure 2C:
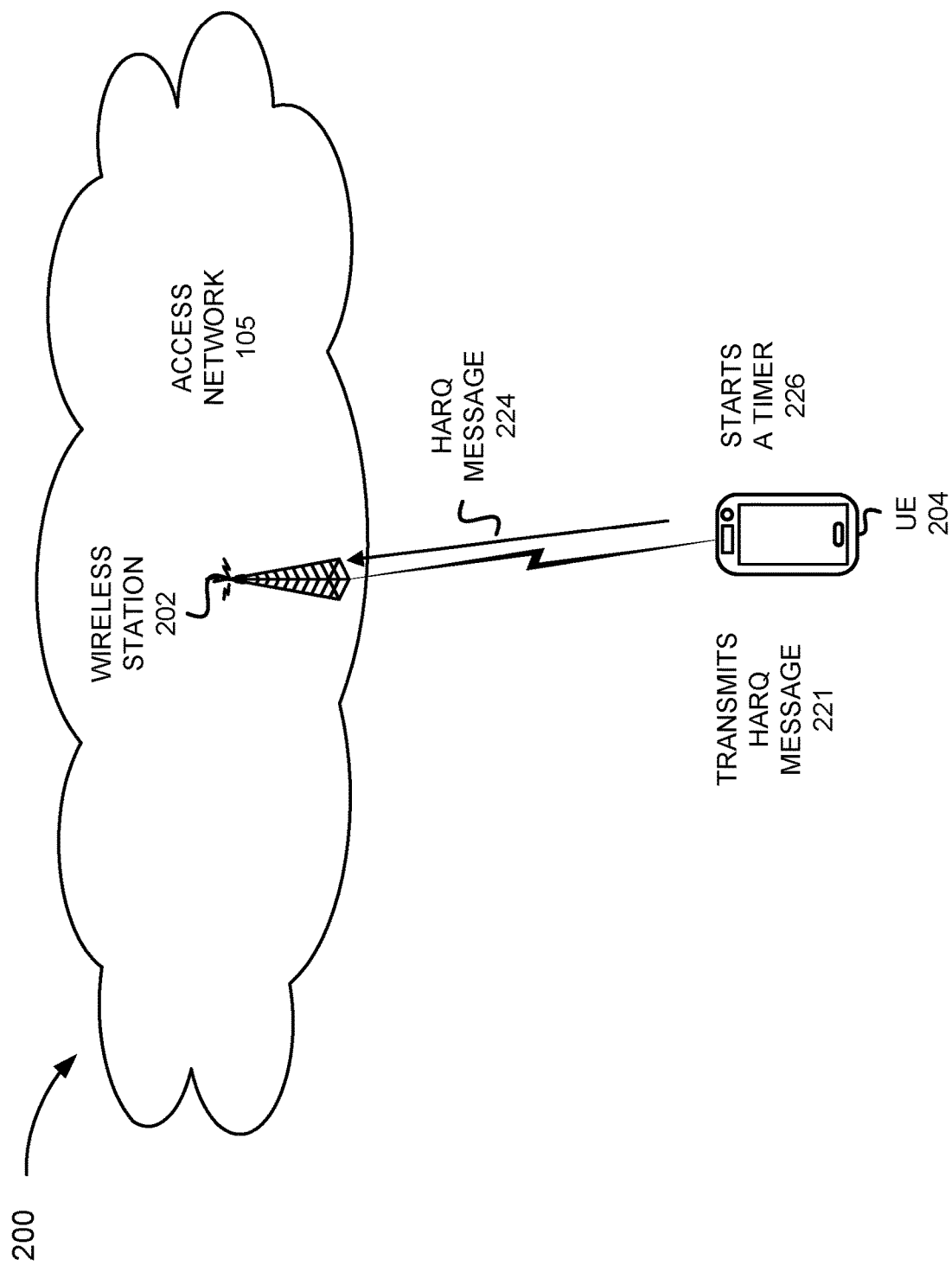

Referring to FIG. 2C, based on determining that the decoding of the downlink data is unsuccessful, UE 204 may transmit a HARQ message 221, which is further illustrated as HARQ message 224. UE 204 may start a timer 226. For example, UE 204 may start a DRX Retransmission timer (e.g., according to the configured drx-retransmissionTimerDL) and/or a DRX HARQ Round Trip Time timer (e.g., according to the configured drx-HARQ-RTT-TimerDL).

Figure 2D:
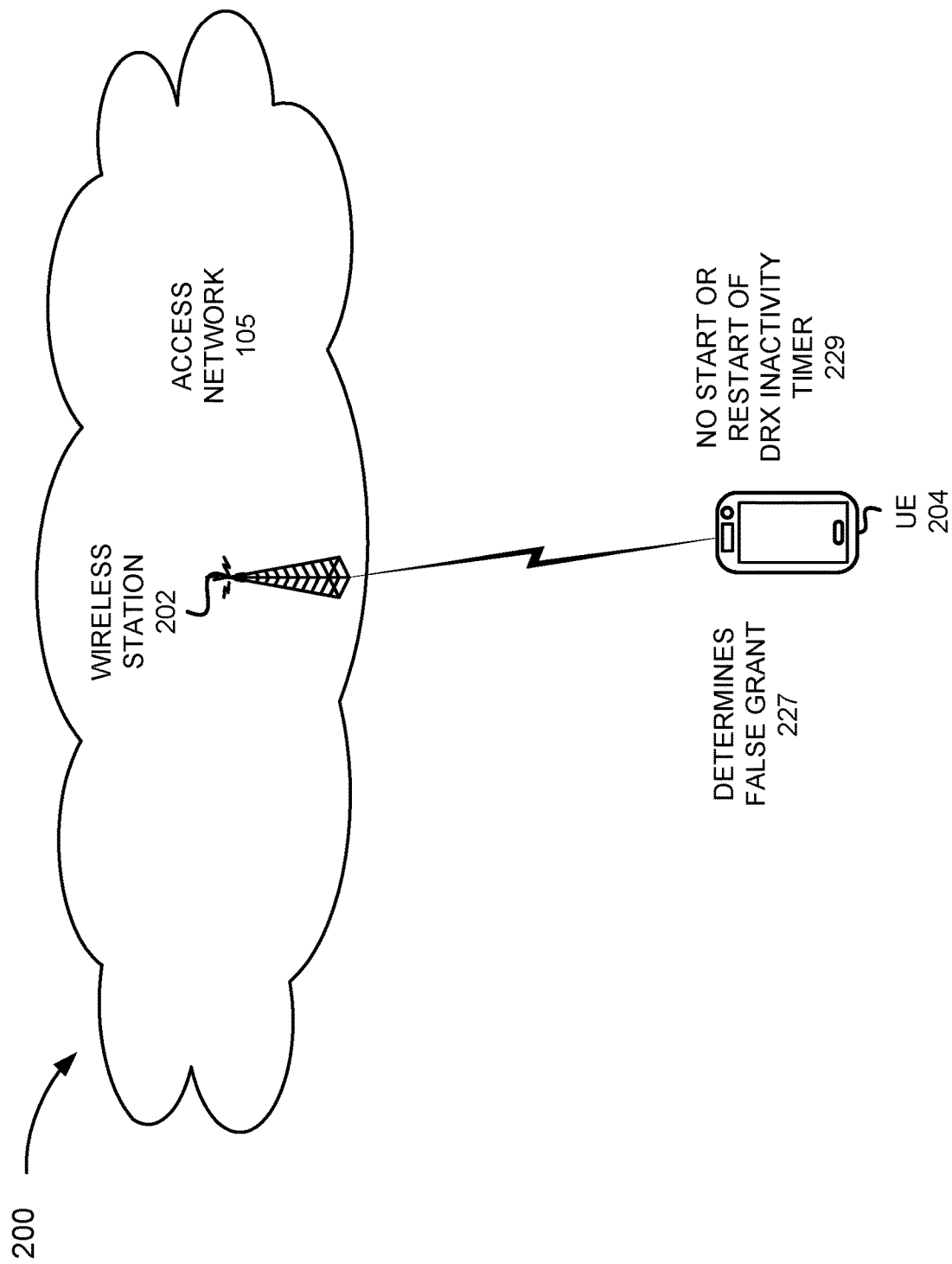

Referring to FIG. 2D, according to one exemplary scenario, UE 204 may not receive a retransmission downlink grant before the timer expires. Based on this circumstance, UE 204 may determine a false grant 227. UE may not start or restart a DRX Inactivity timer 229.

Figure 2E:
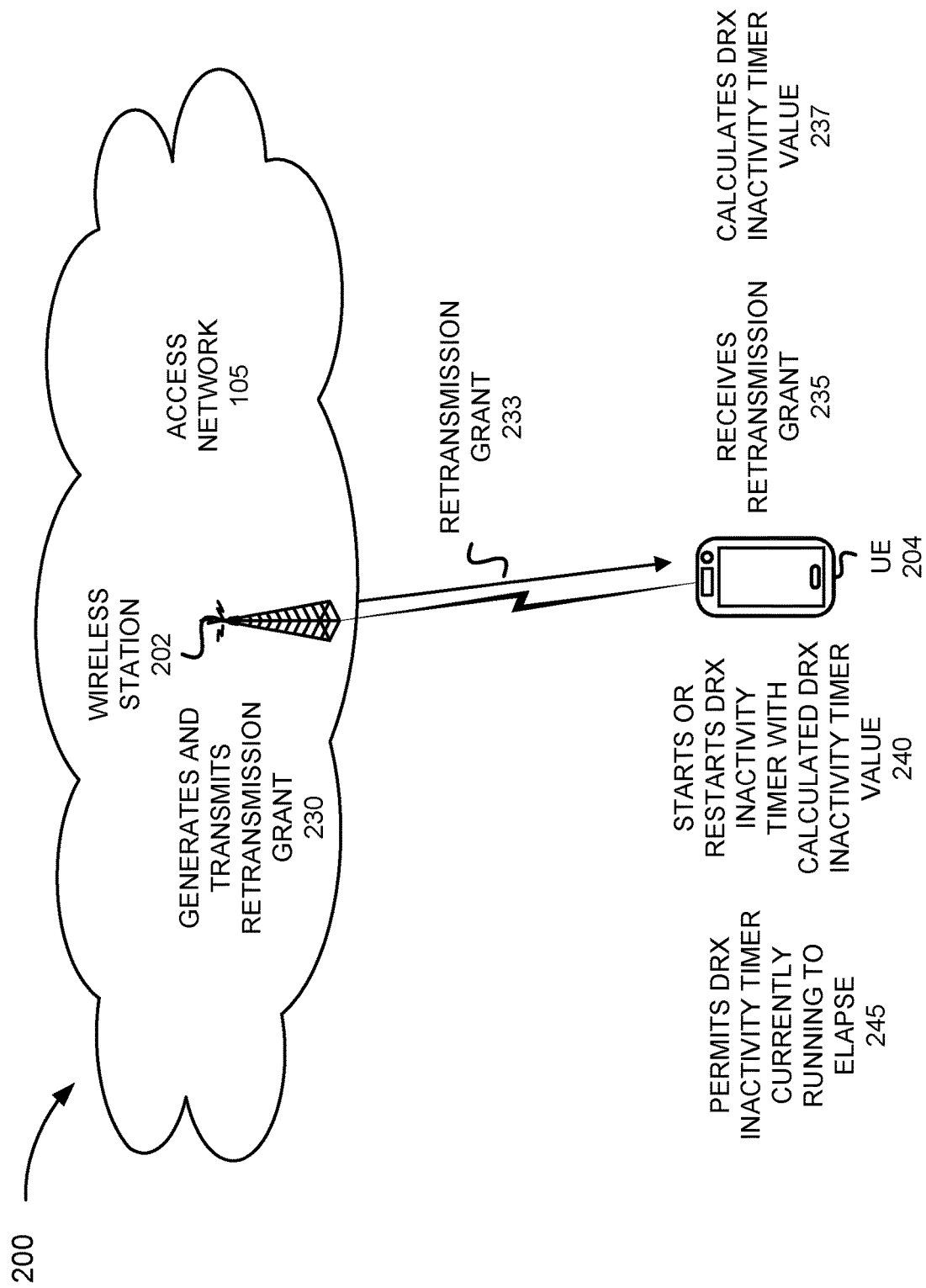
Figure 2F:
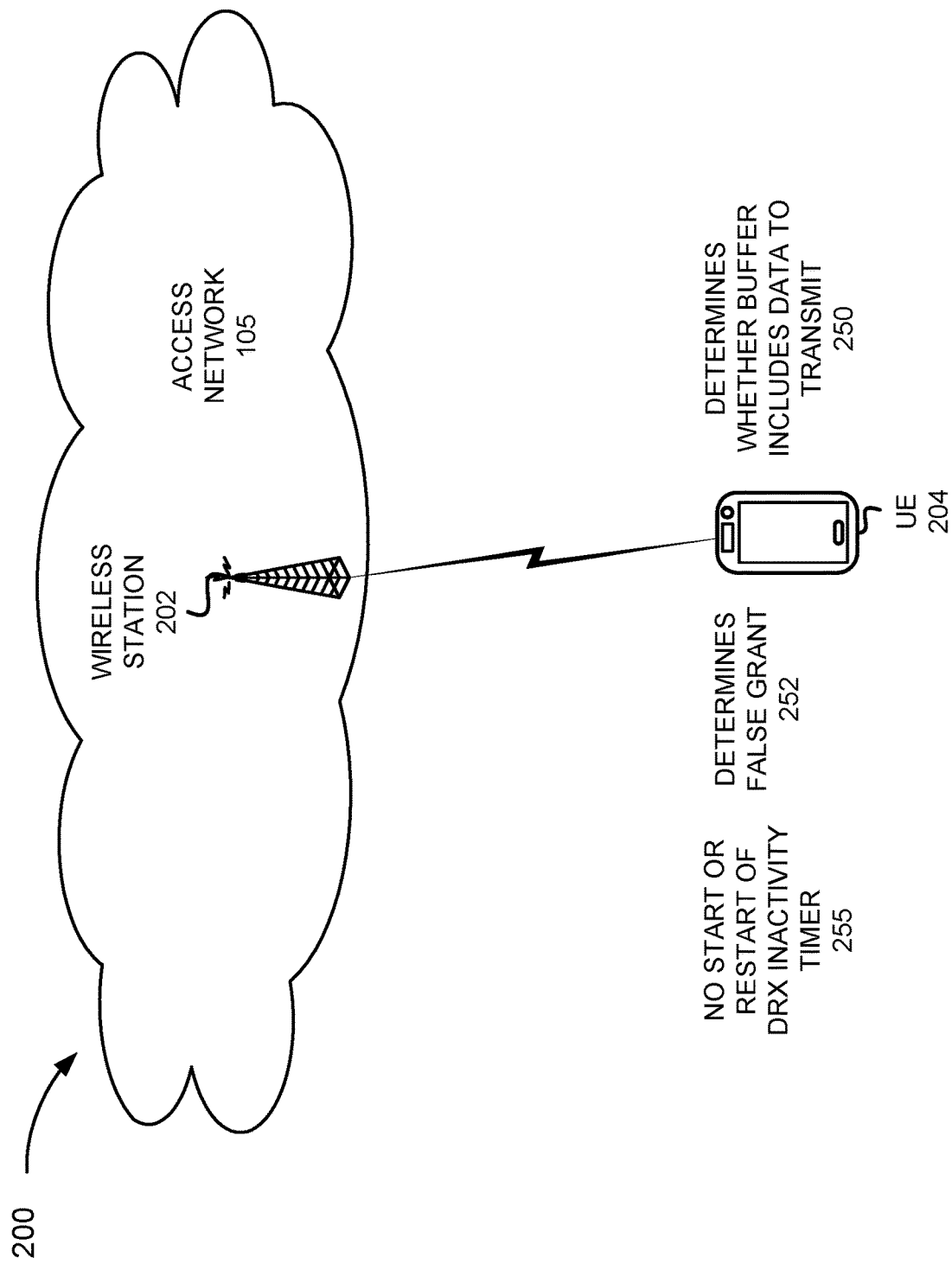

Referring to FIG. 2E, according to another exemplary scenario, in response to the HARQ message transmitted by UE 204 (in FIG. 2C), wireless station 202 may generate and transmit a retransmission grant 230, which is further illustrated as a retransmission grant 233. UE 204 may receive the retransmission grant 235 before the timer expires (in FIG. 2C). In response, according to an exemplary embodiment, UE 204 may calculate a DRX Inactivity timer value 237. For example, UE 204 may calculate the DRX Inactivity timer value according to expression (1), as described herein.

When the DRX Inactivity timer is not running, UE 204 may start the DRX Inactivity timer according to the calculated DRX Inactivity timer value 240, as illustrated in FIG. 2E. However, when the DRX Inactivity timer is running and the remaining time value is less than the calculated DRX Inactivity timer value, UE 204 may restart the DRX Inactivity timer according to the calculated DRX Inactivity timer value 240. According to other circumstances, when the DRX Inactivity timer is running and the remaining time value is equal to or longer than the calculated DRX Inactivity timer value, UE 204 may permit the DRX Inactivity timer to continue to run 245. According to this process, UE 204 may compare the calculated DRX Inactivity timer value (e.g., T) to the remaining time of the currently running DRX Inactivity timer to make the above-mentioned determinations.

While FIGS. 2A-2E may pertain to a new downlink transmission grant, the false grant detection service may be applied to a new uplink transmission grant, as previously described. For example, the process and steps illustrated and described in relation to FIGS. 2A and 2B may be similarly performed for the new uplink transmission grant, except UE 204 may not receive and decode the downlink data. However, referring to FIG. 2F, based on UE 204 determining a new uplink transmission grant from the DCI, UE 204 determine whether there is data to transmit in an uplink transmission buffer or another type of storage device 250. According to an exemplary scenario, when UE 204 determines that there is no data in the buffer or other storage device, UE 204 may determine that there is a false grant 252. In response, UE 204 may not start or restart a DRX Inactivity timer 255.

Figure 2G:
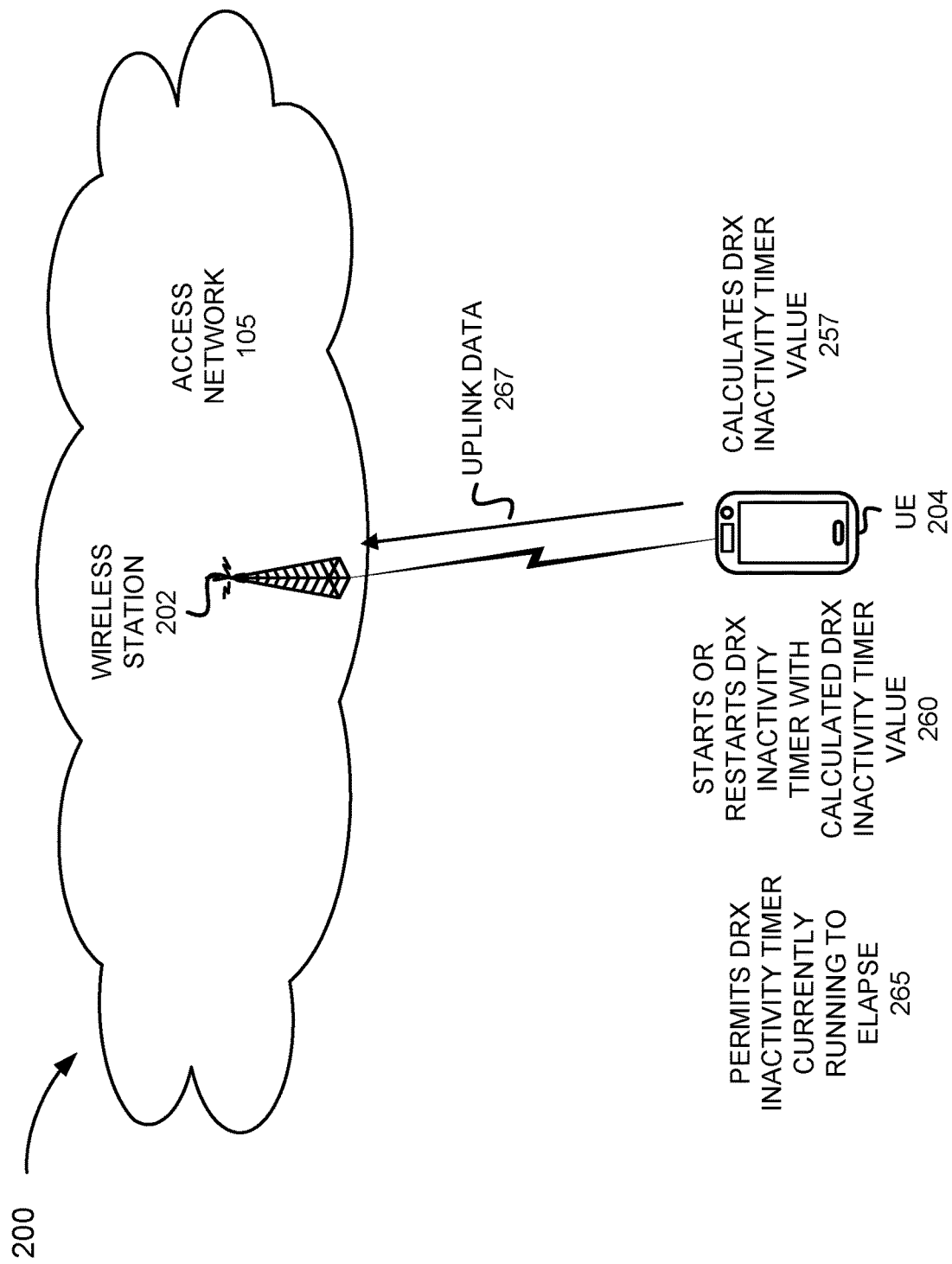

However, according to another exemplary scenario, when UE 204 determines that there is data in the buffer or other storage device, referring to FIG. 2G, UE 204 may calculate a DRX Inactivity timer value 257. For example, UE 204 may calculate the DRX Inactivity timer value according to expression (1), as described herein.

When the DRX Inactivity timer is not running, UE 204 may start the DRX Inactivity timer according to the calculated DRX Inactivity timer value 260, as illustrated in FIG. 2G. However, when the DRX Inactivity timer is running and the remaining time value is less than the calculated DRX Inactivity timer value, UE 204 may restart the DRX Inactivity timer according to the calculated DRX Inactivity timer value 260. According to other circumstances, when the DRX Inactivity timer is running and the remaining time value is equal to or larger than the calculated DRX Inactivity timer value, UE 204 may permit the DRX Inactivity timer to continue to run 265. According to this process, UE 204 may compare the calculated DRX Inactivity timer value (e.g., T) to the remaining time value of the currently running DRX Inactivity timer. UE 204 may transmit the uplink data 267.

FIGS. 2A-2G illustrate and describe exemplary operations of the false grant detection service, according to other embodiments and/or scenarios, the false grant detection service may include operations different from those illustrated and described in FIGS. 2A-2G.

Figure 3A:
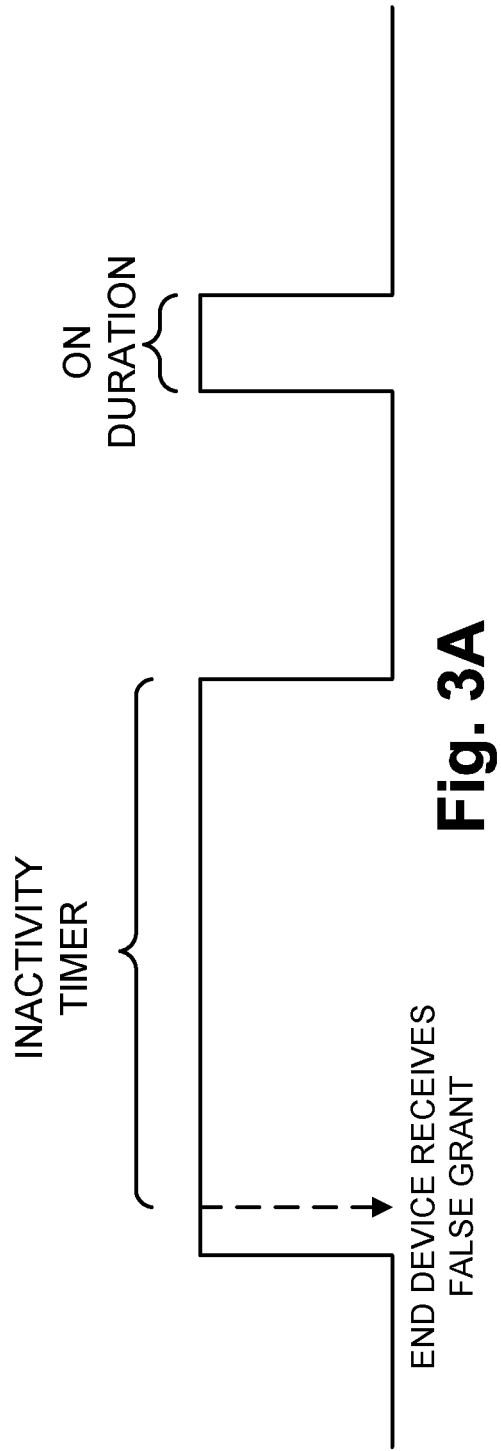
FIG. 3A is a diagram illustrating an exemplary DRX state of an end device when a false grant occurs.
Figure 3B:
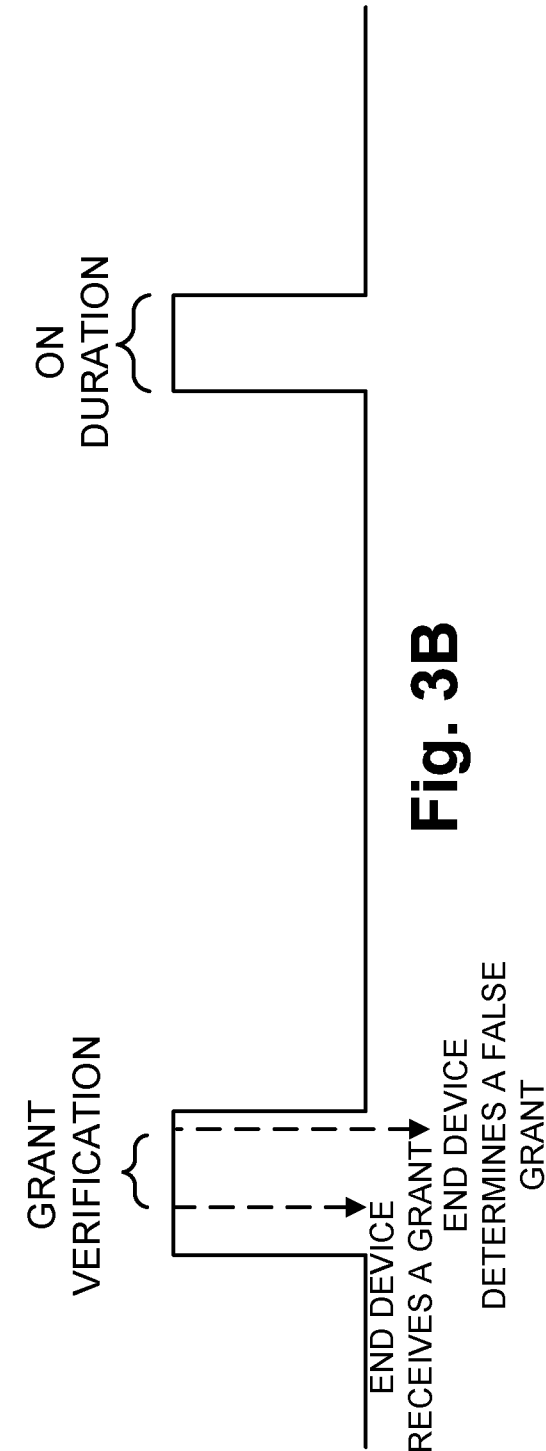
FIG. 3B is a diagram illustrating an exemplary DRX state of an end device when a false grant occurs according to an exemplary embodiment of the false grant detection service.

FIG. 3A is a diagram illustrating an exemplary DRX state of an end device when a false grant occurs. For example, a DRX Inactivity timer may be started due to the receipt of a false grant, which may prolong the time period that the end device is active and not asleep. In contrast, FIG. 3B is a diagram illustrating an exemplary DRX state of an end device when a grant may be received according to an exemplary embodiment of the false grant detection service. As illustrated, when the end device receives a grant during an active state, the prolonged time period may be minimized by virtue of the grant verification procedures. As a result, the end device may return to sleep when the false grant is verified and not start a DRX Inactivity timer.

FIG. 4 is a diagram illustrating exemplary components of a device 400 that may correspond to one or more of the devices described herein. For example, device 400 may correspond to components included in access devices 110 of access network 105 core devices 155 of core network 150, external devices 175 of external network 170, and end device 199. As illustrated in FIG. 4, device 400 includes a bus 405, a processor 410, a memory/storage 415 that stores software 420, a communication interface 425, an input 430, and an output 435. According to other embodiments, device 400 may include fewer components, additional components, different components, and/or a different arrangement of components than those illustrated in FIG. 4 and described herein.

Bus 405 includes a path that permits communication among the components of device 400. For example, bus 405 may include a system bus, an address bus, a data bus, and/or a control bus. Bus 405 may also include bus drivers, bus arbiters, bus interfaces, clocks, and so forth.

Processor 410 includes one or multiple processors, microprocessors, data processors, co-processors, application specific integrated circuits (ASICs), controllers, programmable logic devices, chipsets, field-programmable gate arrays (FPGAs), application specific instruction-set processors (ASIPs), system-on-chips (SoCs), central processing units (CPUs) (e.g., one or multiple cores), microcontrollers, graphical processing units (GPUs), and/or some other type of component that interprets and/or executes instructions and/or data. Processor 410 may be implemented as hardware (e.g., a microprocessor, etc.), a combination of hardware and software (e.g., a SoC, an ASIC, etc.), may include one or multiple memories (e.g., cache, etc.), etc.

Processor 410 may control the overall operation or a portion of operation(s) performed by device 400. Processor 410 may perform one or multiple operations based on an operating system and/or various applications or computer programs (e.g., software 420). Processor 410 may access instructions from memory/storage 415, from other components of device 400, and/or from a source external to device 400 (e.g., a network, another device, etc.). Processor 410 may perform an operation and/or a process based on various techniques including, for example, multithreading, parallel processing, pipelining, interleaving, etc.

Memory/storage 415 includes one or multiple memories and/or one or multiple other types of storage mediums. For example, memory/storage 415 may include one or multiple types of memories, such as, random access memory (RAM), dynamic random access memory (DRAM), cache, read only memory (ROM), a programmable read only memory (PROM), a static random access memory (SRAM), a single in-line memory module (SIMM), a dual in-line memory module (DIMM), a flash memory, and/or some other type of memory. Memory/storage 415 may include a hard disk (e.g., a magnetic disk, an optical disk, a magneto-optic disk, a solid state disk, etc.), a Micro-Electromechanical System (MEMS)-based storage medium, and/or a nanotechnology-based storage medium. Memory/storage 415 may include drives for reading from and writing to the storage medium.

Memory/storage 415 may be external to and/or removable from device 400, such as, for example, a Universal Serial Bus (USB) memory stick, a dongle, a hard disk, mass storage, off-line storage, or some other type of storing medium (e.g., a compact disk (CD), a digital versatile disk (DVD), a Blu-Ray disk (BD), etc.). Memory/storage 415 may store data, software, and/or instructions related to the operation of device 400.

Software 420 includes an application or a program that provides a function and/or a process. As an example, with reference to end device 199, software 420 may include an application that, when executed by processor 410, provides the functions of the false grant detection service, as described herein. Software 420 may also include firmware, middleware, microcode, hardware description language (HDL), and/or other form of instruction. Software 420 may further include an operating system (OS) (e.g., Linux, Android, proprietary, etc.).

Communication interface 425 permits device 400 to communicate with other devices, networks, systems, and/or the like. Communication interface 425 includes one or multiple wireless interfaces and/or wired interfaces. For example, communication interface 425 may include one or multiple transmitters and receivers, or transceivers. Communication interface 425 may operate according to a protocol stack and a communication standard. Communication interface 425 may include an antenna. Communication interface 425 may include various processing logic or circuitry (e.g., multiplexing/de-multiplexing, filtering, amplifying, converting, error correction, etc.).

Input 430 permits an input into device 400. For example, input 430 may include a keyboard, a mouse, a display, a touchscreen, a touchless screen, a button, a switch, an input port, speech recognition logic, and/or some other type of visual, auditory, tactile, etc., input component. Output 435 permits an output from device 400. For example, output 435 may include a speaker, a display, a touchscreen, a touchless screen, a light, an output port, and/or some other type of visual, auditory, tactile, etc., output component.

Device 400 may perform a process and/or a function, as described herein, in response to processor 410 executing software 420 stored by memory/storage 415. By way of example, instructions may be read into memory/storage 415 from another memory/storage 415 (not shown) or read from another device (not shown) via communication interface 425. The instructions stored by memory/storage 415 cause processor 410 to perform a process described herein. Alternatively, for example, according to other implementations, device 400 performs a process described herein based on the execution of hardware (processor 410, etc.).

Figure 5A:
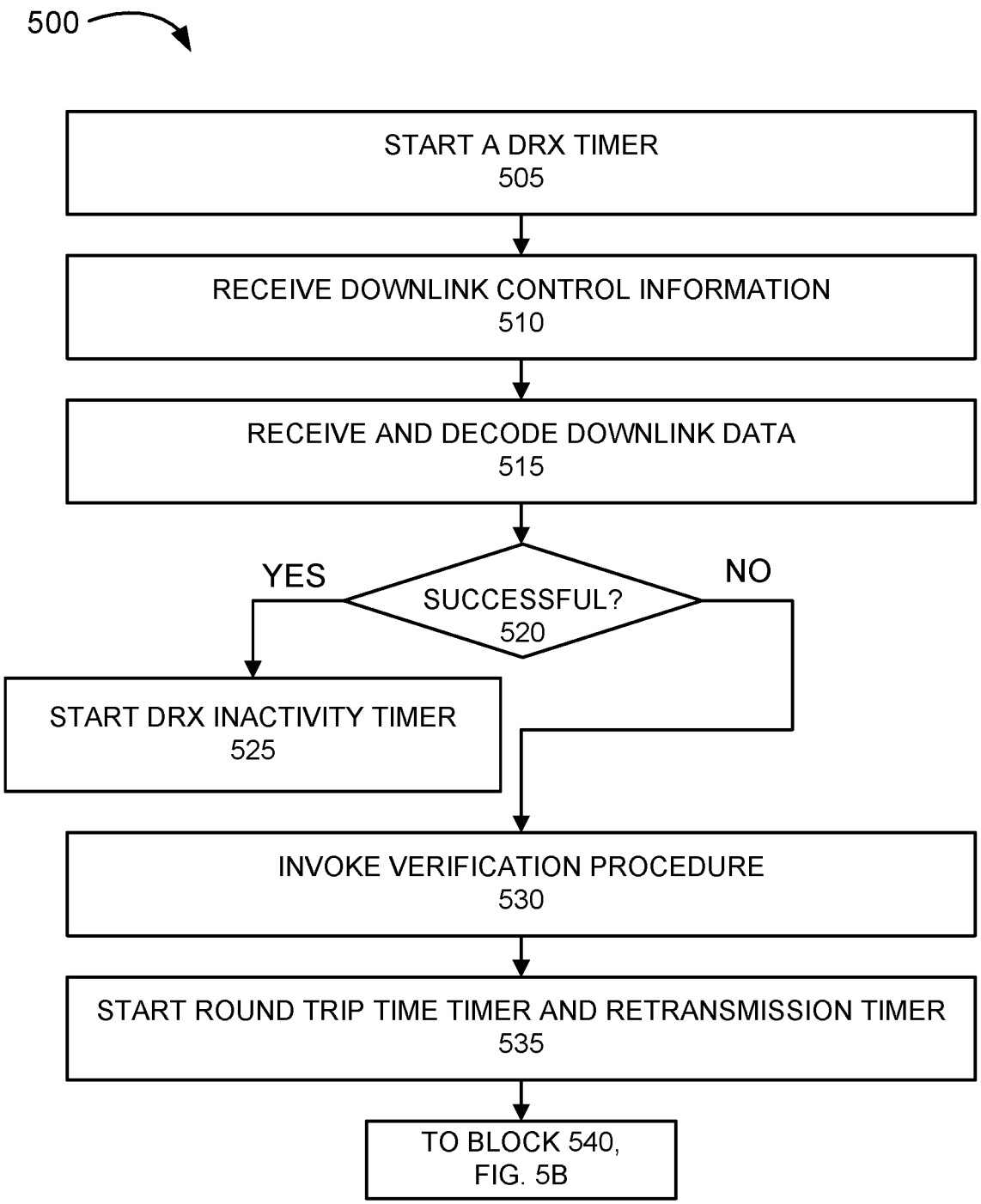
FIGS. 5A and 5B are flow diagrams illustrating an exemplary process of an exemplary embodiment of the false grant detection service.
Figure 5B:
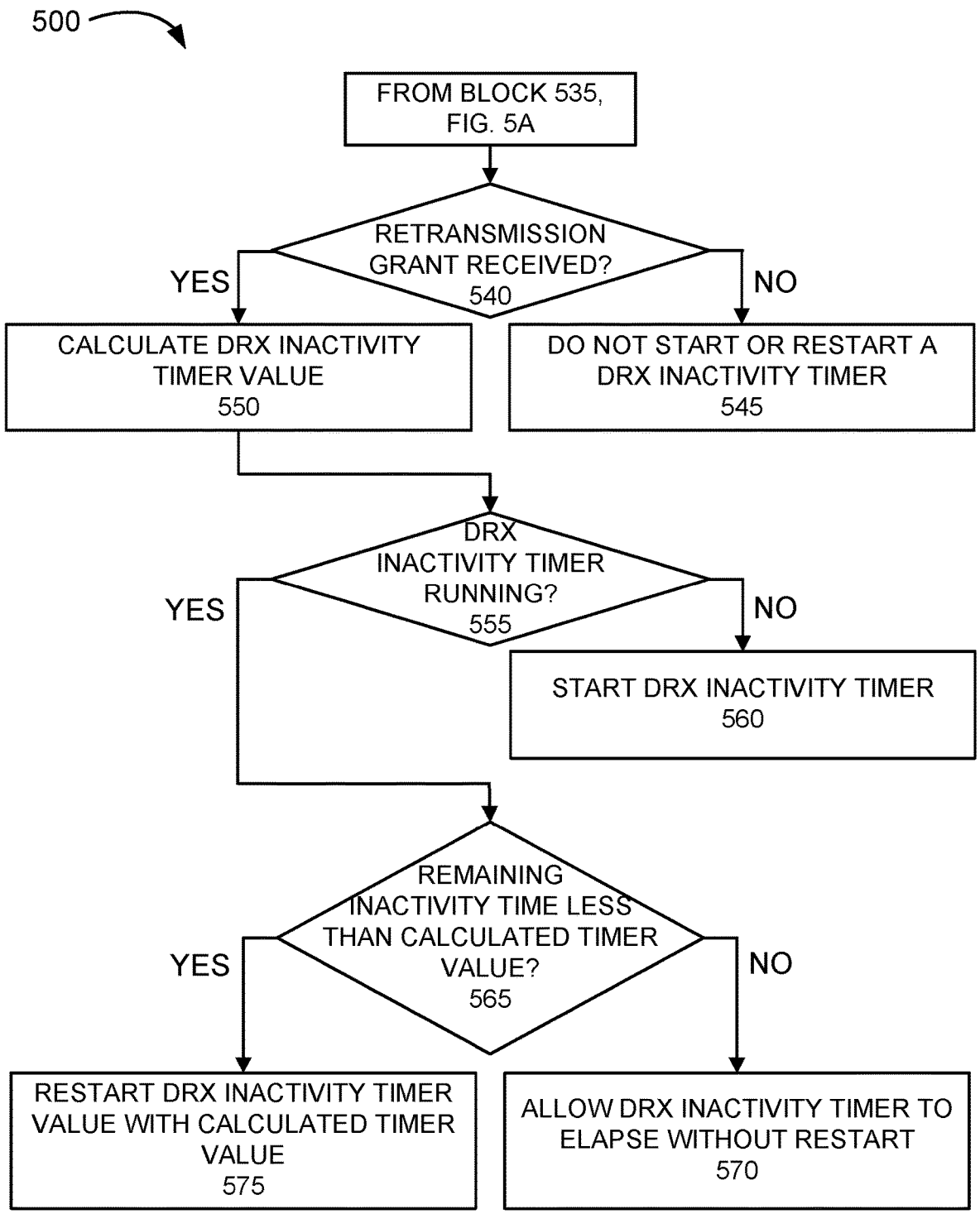

FIGS. 5A and 5B are flow diagrams illustrating an exemplary process 500 of an exemplary embodiment of the false grant detection service. According to an exemplary embodiment, end device 199 performs the steps of process 500. According to an exemplary embodiment, processor 410 executes software 420 to perform a step illustrated in FIGS. 5A and 5B, and described herein. Alternatively, a step illustrated in FIGS. 5A and 5B and described herein, may be performed by execution of only hardware.

According to some exemplary embodiments, process 500 may be performed subsequent to end device 199 being attached to core network 150 via access network 105. Process 500 may pertain to a new downlink transmission grant. According to an exemplary embodiment, end device 199 may be in a connected mode or state relative to access network 105 and/or core network 150.

Referring to FIG. 5A, block 505 of process 500, end device 199 may start a DRX timer. For example, end device 199 may start an On Duration timer for which end device 199 may be active or "on" and may monitor a control channel. In block 510, end device 199 may receive downlink control information. End device 199 may decode the downlink control information and may detect a new downlink transmission grant. In block 515, based on the downlink control information, end device 199 may receive and decode downlink data.

In block 520, end device 199 may determine whether the decoding is successful. When end device 199 determines that the decoding is successful (block 520—YES), end device 199 may start a DRX Inactivity timer (block 525). When end device 199 determines that the decoding is unsuccessful (block 520—NO), end device 199 may invoke a verification procedure (block 530). The verification procedure may include end device 199 generating and transmitting a downlink HARQ to access device 110. In block 535, end device 199 may start a HARQ RTT timer and/or a Retransmission timer.

Referring to FIG. 5B, end device 199 may monitor for receipt of a HARQ response, such as a retransmission grant during the running of the timer(s). In block 540, end device 199 may determine whether a retransmission grant is received. When end device 199 determines that a retransmission grant has not been received before the expiration of the timer(s) (block 540—NO), end device 199 may not start or restart a DRX Inactivity timer (block 545). For example, end device 199 may determine that the downlink grant was a false grant. When end device 199 determines that a retransmission grant has been received before the expiration of the timer(s) (block 540—YES), end device 199 may calculate a DRX Inactivity timer value (block 550). For example, end device 199 may calculate the DRX Inactivity timer value based on expression (1).

In block 555, end device 199 may determine whether a DRX Inactivity timer is currently running. When end device 199 determines that a DRX Inactivity timer is not currently running (block 555—NO), end device 199 may start a DRX Inactivity timer based on the calculated DRX Inactivity timer value (block 560).

When end device 199 determines that a DRX Inactivity timer is currently running (block 555—YES), end device 199 may determine whether the remaining inactivity time is less than the calculated DRX Inactivity timer value (block 565). For example, end device 199 may compare the timer values. When end device 199 determines that the remaining inactivity time is not less than or equal to the calculated DRX Inactivity timer value (block 565—NO), end device 199 may allow the DRX Inactivity timer to continue to run (e.g., without restart) (block 570). When end device 199 determines that the remaining inactivity time is less than the calculated time value (block 565—YES), end device 199 may restart a DRX Inactivity time having the calculated timer value (block 575).

FIGS. 5A and 5B illustrate an exemplary process of the false grant detection service, according to other embodiments, process 500 may include additional operations, fewer operations, and/or different operations than those illustrated in FIGS. 5A and 5B, and described herein.

Figure 6:
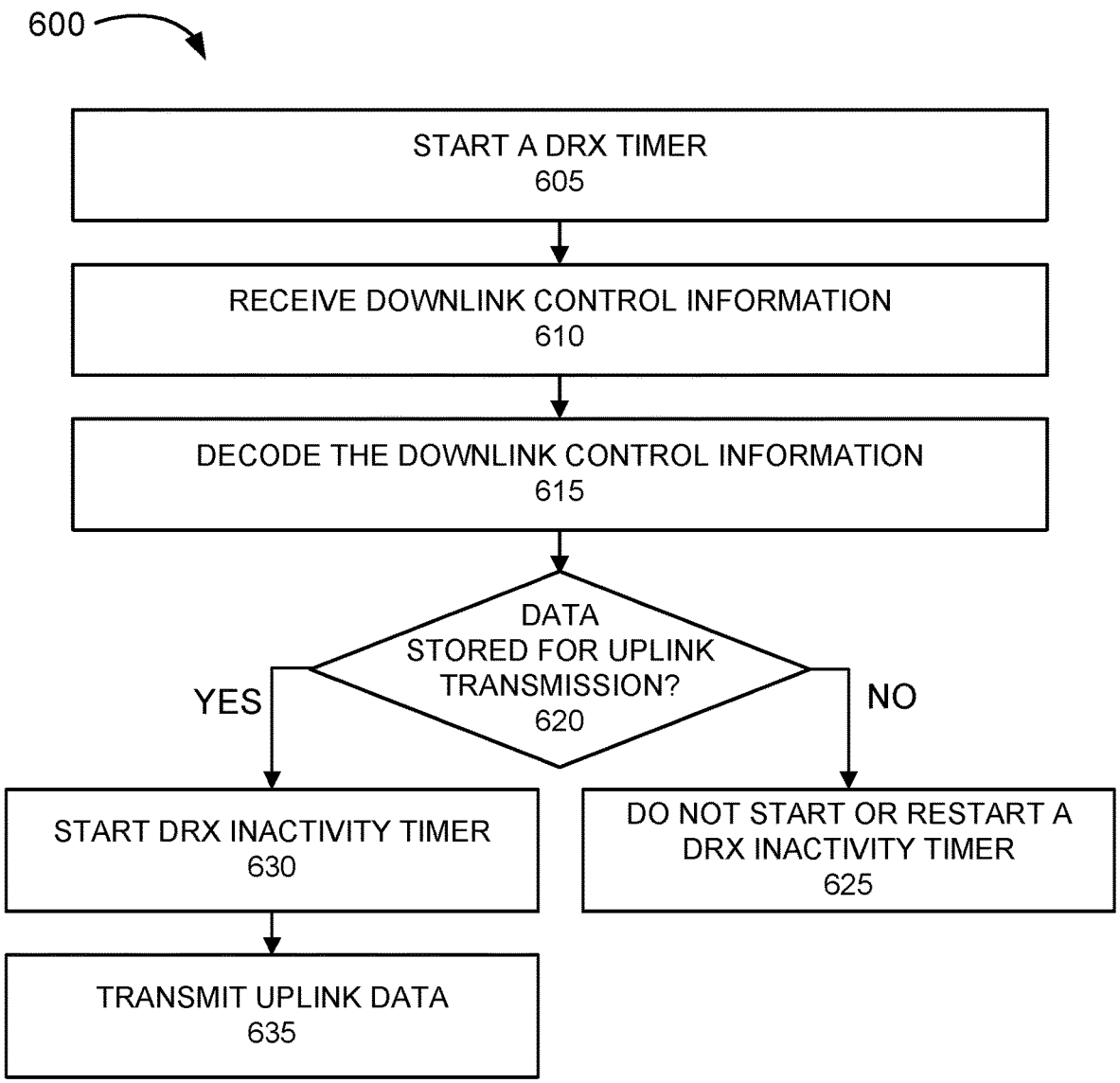
FIG. 6 is a flow diagram illustrating another exemplary process of an exemplary embodiment of the false grant detection service.

FIG. 6 is a flow diagram illustrating another exemplary process 600 of an exemplary embodiment of the false grant detection service. According to an exemplary embodiment, end device 199 may performs the steps of process 600. According to an exemplary embodiment, processor 410 executes software 420 to perform the steps illustrated in FIG. 6, and described herein. Alternatively, a step illustrated in FIG. 6 and described herein, may be performed by execution of only hardware.

According to some exemplary embodiments, process 600 may be performed subsequent to end device 199 being attached to core network 150 via access network 105. Process 600 may pertain to a new uplink transmission grant. According to an exemplary embodiment, end device 199 may be in a connected mode or state relative to access network 105 and/or core network 150.

Referring to FIG. 6, block 605 of process 600, end device 199 may start a DRX timer. For example, end device 199 may start an On Duration timer for which end device 199 may be active or "on" and may monitor a control channel. In block 610, end device 199 may receive downlink control information. In block 615, end device 199 may decode the downlink control information and may detect a new uplink transmission grant.

Based on the detection of the new uplink transmission grant, end device 199 may identify the grant as a potential false grant and invoke a verification procedure. The verification procedure may include end device 199 determining whether data is stored for an uplink transmission (e.g., in a buffer or another type of memory or storage device of end device 199). When end device 199 determines that there is no data stored for an uplink transmission (block 620—NO), end device 199 may not start or restart a DRX Inactivity timer (block 625). When end device 199 determines that there is data stored for an uplink transmission (block 620—YES), end device 199 may start a DRX Inactivity timer (block 635). In block 635, end device 199 may transmit the uplink data.

FIG. 6 illustrates an exemplary process of the false grant detection service, according to other embodiments, process 600 may include additional operations, fewer operations, and/or different operations than those illustrated in FIG. 6, and described herein.

As set forth in this description and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment(s). The same applies to the term "implementation," "implementations," etc.

The foregoing description of embodiments provides illustration, but is not intended to be exhaustive or to limit the embodiments to the precise form disclosed. Accordingly, modifications to the embodiments described herein may be possible. For example, various modifications and changes may be made thereto, and additional embodiments may be implemented, without departing from the broader scope of the invention as set forth in the claims that follow. The description and drawings are accordingly to be regarded as illustrative rather than restrictive.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items. The word "exemplary" is used herein to mean "serving as an example." Any embodiment or implementation described as "exemplary" is not necessarily to be construed as preferred or advantageous over other embodiments or implementations.

In addition, while series of blocks have been described with regard to the processes illustrated in FIGS. 5A, 5B, and 6, the order of the blocks may be modified according to other embodiments. Further, non-dependent blocks may be performed in parallel. Additionally, other processes described in this description may be modified and/or non-dependent operations may be performed in parallel.

Embodiments described herein may be implemented in many different forms of software executed by hardware. For example, a process or a function may be implemented as "logic," a "component," or an "element." The logic, the component, or the element, may include, for example, hardware (e.g., processor 410, etc.), or a combination of hardware and software (e.g., software 420).

Embodiments have been described without reference to the specific software code because the software code can be designed to implement the embodiments based on the description herein and commercially available software design environments and/or languages. For example, various types of programming languages including, for example, a compiled language, an interpreted language, a declarative language, or a procedural language may be implemented.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

Additionally, embodiments described herein may be implemented as a non-transitory computer-readable storage medium that stores data and/or information, such as instructions, program code, a data structure, a program module, an application, a script, or other known or conventional form suitable for use in a computing environment. The program code, instructions, application, etc., is readable and executable by a processor (e.g., processor 410) of a device. A non-transitory storage medium includes one or more of the storage mediums described in relation to memory/storage 415. The non-transitory computer-readable storage medium may be implemented in a centralized, distributed, or logical division that may include a single physical memory device or multiple physical memory devices spread across one or multiple network devices.

To the extent the aforementioned embodiments collect, store or employ personal information of individuals, it should be understood that such information shall be collected, stored, and used in accordance with all applicable laws concerning protection of personal information. Additionally, the collection, storage and use of such information can be subject to consent of the individual to such activity, for example, through well known "opt-in" or "opt-out" processes as can be appropriate for the situation and type of information. Collection, storage and use of personal information can be in an appropriately secure manner reflective of the type of information, for example, through various encryption and anonymization techniques for particularly sensitive information.

No element, act, or instruction set forth in this description should be construed as critical or essential to the embodiments described herein unless explicitly indicated as such.

All structural and functional equivalents to the elements of the various aspects set forth in this disclosure that are known or later come to be known are expressly incorporated herein by reference and are intended to be encompassed by the claims.

What is claimed is:

1. A method comprising:
    detecting, by an end device, a new transmission grant via a downlink control channel, wherein the end device is in a discontinuous reception active state;
    determining, by the end device, that the new transmission grant is a potential false grant;
    performing, by the end device, a verification procedure pertaining to the potential false grant; and
    determining, by the end device based on a result of the verification procedure, whether the potential false grant is a valid grant or a false grant, wherein when the potential false grant is the false grant, the method further comprising:
    omitting, by the end device, to start a discontinuous reception inactivity timer.

2. The method of claim 1, wherein the new transmission grant is a new downlink transmission grant.

3. The method of claim 2, further comprising:
    receiving, by the end device, downlink traffic pertaining to the new downlink transmission grant; and
    decoding, by the end device, the downlink traffic; and
    wherein determining that the new transmission grant is the potential false grant further comprises:
    determining, by the end device, that the downlink traffic is unsuccessfully decoded.

4. The method of claim 2, wherein the performing further comprises:
    starting, by the end device, a timer;
    transmitting, by the end device to a wireless station, a hybrid automatic repeat request message; and
    determining, by the end device, whether a retransmission grant is received prior to an expiration of the timer.

5. The method of claim 1, wherein when the potential false grant is the valid grant, the method further comprising:
    calculating, by the end device, a discontinuous reception inactivity timer value based on a time elapsed for performing the verification procedure;
    determining, by the end device, that the discontinuous reception inactivity timer is currently running;
    comparing, by the end device, the discontinuous reception inactivity timer value to a remaining time value of the discontinuous reception inactivity timer; and
    restarting, by the end device based on the comparing, the discontinuous reception inactivity timer with the discontinuous reception inactivity timer value when the remaining time value is less than the discontinuous reception inactivity timer value.

6. The method of claim 1,
    wherein the new transmission grant is a new uplink transmission grant.

7. The method of claim 1, wherein the new transmission grant is a new uplink transmission grant, and the performing further comprising:
    determining, by the end device, whether uplink data is stored for an uplink transmission;
    and wherein determining whether the potential false grant is the valid grant or the false grant further comprises:
    determining, by the end device, that the potential false grant is the false grant when there is no uplink data stored for the uplink transmission.

8. The method of claim 1, further comprising:
    entering, by the end device, a sleep mode.

9. A device comprising:
    a communication interface;
    a processor, wherein the processor is configured to:
        detect a new transmission grant via a downlink control channel, wherein the device is in a discontinuous reception active state;
        determine that the new transmission grant is a potential false grant;
        perform a verification procedure pertaining to the potential false grant; and
        determine, based on a result of the verification procedure, whether the potential false grant is a valid grant or a false grant, wherein when the potential false grant is the false grant, the processor is further configured to:
   omit to start a discontinuous reception inactivity timer.

10. The device of claim 9, wherein the new transmission grant is a new downlink transmission grant.

11. The device of claim 10, wherein the processor is further configured to:
   receive, via the communication interface, downlink traffic pertaining to the new downlink transmission grant; and
   decode the downlink traffic; and wherein determining that the new transmission grant is the potential false grant, the processor is further configured to:
   determine that the downlink traffic is unsuccessfully decoded.

12. The device of claim 10, wherein when performing, the processor is further configured to:
   start a timer;
   transmit, via the communication interface to a wireless station, a hybrid automatic repeat request message; and
   determine whether a retransmission grant is received prior to an expiration of the timer.

13. The device of claim 9, wherein when the potential false grant is the valid grant, the processor is further configured to:
   calculate a discontinuous reception inactivity timer value based on a time elapsed for performing the verification procedure;
   determine that the discontinuous reception inactivity timer is currently running;
   compare the discontinuous reception inactivity timer value to a remaining time value of the discontinuous reception inactivity timer; and
   restart, based on the comparison, the discontinuous reception inactivity timer with the discontinuous reception inactivity timer value when the remaining time value is less than the discontinuous reception inactivity timer value.

14. The device of claim 9, wherein the new transmission grant is a new uplink transmission grant.

15. The device of claim 9, wherein the new transmission grant is a new uplink transmission grant, and when performing, the processor is further configured to:
   determine whether uplink data is stored for an uplink transmission; and wherein determining whether the potential false grant is the valid grant or the false grant, the processor is further configured to:
   determine that the potential false grant is the false grant when there is no uplink data stored for the uplink transmission.

16. The device of claim 9, wherein the processor is further configured to:
   enter a sleep mode.

17. A non-transitory, computer-readable storage medium storing instructions executable by a processor of a device, which when executed cause the device to:
   detect a new transmission grant via a downlink control channel, wherein the device is in a discontinuous reception active state;
   determine that the new transmission grant is a potential false grant;
   perform a verification procedure pertaining to the potential false grant; and
   determine, based on a result of the verification procedure, whether the potential false grant is a valid grant or a false grant, wherein when the potential false grant is the false grant, the instructions when executed cause the device to:
   omit to start a discontinuous reception inactivity timer.

18. The non-transitory, computer-readable storage medium of claim 17, wherein the new transmission grant is a new downlink transmission grant, and wherein the instructions executable by the processor of the device, which when executed cause the device to:
   receive downlink traffic pertaining to the new downlink transmission grant; and
   decode the downlink traffic; and wherein determining that the new transmission grant is the potential false grant, cause the device to:
   determine that the downlink traffic is unsuccessfully decoded.

19. The non-transitory, computer-readable storage medium of claim 18, wherein the instructions to perform further comprises instructions executable by the processor of the device, which when executed cause the device to:
   start a timer;
   transmit to a wireless station, a hybrid automatic repeat request message; and
   determine whether a retransmission grant is received prior to an expiration of the timer.

20. The non-transitory, computer-readable storage medium of claim 17, wherein when the potential false grant is the valid grant, the instructions executable by the processor of the device, which when executed cause the device to:
   calculate a discontinuous reception inactivity timer value based on a time elapsed for performing the verification procedure;
   determine that the discontinuous reception inactivity timer is currently running;
   compare the discontinuous reception inactivity timer value to a remaining time value of the discontinuous reception inactivity timer; and
   restart, based on the comparison, the discontinuous reception inactivity timer with the discontinuous reception inactivity timer value when the remaining time value is less than the discontinuous reception inactivity timer value.

* * * * *